US012715605B2

(12) United States Patent
Karas et al.

(10) Patent No.: US 12,715,605 B2
(45) Date of Patent: Aug. 25, 2026

(54) CONTROL MARGIN DISPLAY METHODS AND SYSTEMS

(71) Applicant: HONEYWELL INTERNATIONAL INC., Charlotte, NC (US)

(72) Inventors: Ondrej Karas, Brno (CZ); Juraj Holaza, Brno (CZ)

(73) Assignee: Honeywell Aerospace US LLC, Phoenix, AZ (US)

( * ) Notice: Subject to any disclaimer, the term of this patent is extended or adjusted under 35 U.S.C. 154(b) by 191 days.

(21) Appl. No.: 18/487,394

(22) Filed: Oct. 16, 2023

(65) Prior Publication Data

US 2025/0121949 A1 Apr. 17, 2025

(51) Int. Cl.

| | |
|---|---|
| ***B64D 43/00*** | (2006.01) |
| ***B64C 13/16*** | (2006.01) |
| ***B64C 29/00*** | (2006.01) |
| ***B64D 45/00*** | (2006.01) |
| ***G01C 23/00*** | (2006.01) |

(Continued)

(52) U.S. Cl.

CPC .............. *B64D 43/00* (2013.01); *B64C 13/16* (2013.01); *B64D 45/0005* (2013.01); *G01C 23/00* (2013.01); *B64C 29/0008* (2013.01); *G05D 1/82* (2024.01); *G05D 2105/22* (2024.01); *G05D 2109/23* (2024.01)

(58) Field of Classification Search

CPC ................ B64D 43/00; B64D 45/0005; B64C 29/0008; B64C 13/16; G01C 23/00; G05D 2105/22; G05D 2109/23; G05D 1/82

See application file for complete search history.

(56) References Cited

U.S. PATENT DOCUMENTS 9,073,623 B1 * 7/2015 Suh .................... G01M 5/0016
11,016,506 B2 5/2021 Irwin, III et al.

(Continued)

FOREIGN PATENT DOCUMENTS

CA 2839626 A1 * 8/2014 ............ G08B 23/00
CN 111580537 A 8/2020

(Continued)

OTHER PUBLICATIONS

JP-2014166818 Miyoshi original and machine translation (Year: 2014).*

*Primary Examiner* — Kito R Robinson
*Assistant Examiner* — Zachary E. F. Glade
(74) *Attorney, Agent, or Firm* — Ingrassia Fisher & Lorenz

(57) ABSTRACT

Vehicle systems and methods are provided for assisting operation by providing indication of remaining control margin with respect to actuation of a user input device to adjust an inertial rate of a vehicle. An exemplary method involves identifying one or more effector limits for one or more effectors associated with an aircraft based at least in part on current aircraft state information and current actuation state information for the one or more effectors using a flight dynamics model associated with the aircraft, determining a range of potential effective input commands for a user input device associated with the one or more effectors to adjust one or more inertial rates of the aircraft based on the one or more effector limits, the current aircraft state information and the current actuation state information, and providing a user indication of the range of potential effective input commands.

19 Claims, 4 Drawing Sheets

(51) Int. Cl.

| | |
|---|---|
| ***G05D 1/82*** | (2024.01) |
| ***G05D 105/22*** | (2024.01) |
| ***G05D 109/22*** | (2024.01) |

(56) References Cited

U.S. PATENT DOCUMENTS

| | | | | |
|---|---|---|---|---|
| 11,597,511 | B2 | 3/2023 | Moore et al. | |
| 11,603,196 | B2 | 3/2023 | Lindsey et al. | |
| 2014/0232568 | A1 | 8/2014 | Pennell et al. | |
| 2014/0316613 | A1* | 10/2014 | Jang | G05B 23/0286 701/3 |
| 2017/0038223 | A1* | 2/2017 | Toumazet | B64D 45/00 |
| 2019/0337634 | A1 | 11/2019 | Geiger et al. | |
| 2020/0066171 | A1* | 2/2020 | Prosser | G08G 5/21 |
| 2020/0216167 | A1* | 7/2020 | Hassan | B64C 13/0421 |
| 2021/0294355 | A1 | 9/2021 | English et al. | |
| 2022/0317706 | A1* | 10/2022 | Moy | G05D 1/0011 |
| 2023/0166838 | A1 | 6/2023 | Mikic et al. | |

FOREIGN PATENT DOCUMENTS

| | | | | | |
|---|---|---|---|---|---|
| EP | 1429220 | B2 | | 9/2006 | |
| EP | 3235734 | A1 | | 10/2017 | |
| EP | 3845450 | A1 | | 7/2021 | |
| JP | 2014166818 | A | * | 9/2014 | B64C 13/0421 |
| WO | WO-2017021414 | A1 | * | 2/2017 | G01C 23/005 |
| WO | 20240249157 | A1 | | 12/2024 | |

* cited by examiner

CONTROL MARGIN DISPLAY METHODS AND SYSTEMS

TECHNICAL FIELD

The subject matter described herein relates generally to vehicle systems, and more particularly, embodiments of the subject matter relate to aircraft systems and related cockpit displays for depicting the relationship of the capability of the aircraft to effectively respond to potential input control commands from a pilot or other operator.

BACKGROUND

During operation of an aircraft, it is often desirable to maintain operation within a desired range of effector positions or configurations along with corresponding aircraft speeds, angles of attack and/or the like for safety purposes to avoid stalls or other undesirable aerodynamic conditions while ensuring adequate thrust or lift remains to prevent loss of control of the aircraft. For modern aircraft, such as vertical takeoff and landing (VTOL) aircraft, the amount of control margin remaining is not intuitive due to the number of different effectors capable of being operated independently of one another to provide lift, propulsion, and/or attitude control for the aircraft (e.g., propellers, lift fans, rotors, flight control surface actuators, and/or the like) while using a shared or common inceptor or other pilot input device. Accordingly, it is desirable to provide systems and methods for informing a pilot, co-pilot or other crew member of the remaining amount of available control margin before limiting or saturating the ability of the operator to control the aircraft with respect to a particular axis. Other desirable features and characteristics will become apparent from the subsequent detailed description and the appended claims, taken in conjunction with the accompanying drawings and the foregoing technical field and background.

BRIEF SUMMARY

Vehicle systems and methods are provided for assisting operation of an aircraft by providing indicia of a remaining available control margin, for example, for a vertical takeoff and landing (VTOL) aircraft. One method involves obtaining current aircraft state information, obtaining current actuation state information for one or more effectors associated with the aircraft, identifying one or more effector limits for the one or more effectors based at least in part on the current aircraft state information and the current actuation state information using a flight dynamics model associated with the aircraft, determining a range of potential effective input commands for a user input device associated with the one or more effectors to adjust one or more inertial rates of the aircraft based on the one or more effector limits, the current aircraft state information and the current actuation state information, and providing a user indication of a relationship between an input state of the user input device and the range of potential effective input commands.

An apparatus is also provided for a non-transitory computer-readable medium having computer-executable instructions stored thereon that, when executed by a processing system, cause the processing system to, obtain current aircraft state information, obtain current actuation state information for one or more effectors associated with the aircraft, identify one or more effector limits for the one or more effectors based at least in part on the current aircraft state information and the current actuation state information using a flight dynamics model associated with the aircraft, determine a range of potential effective input commands for a user input device associated with the one or more effectors to adjust one or more inertial rates of the aircraft based on the one or more effector limits, the current aircraft state information and the current actuation state information, and provide a user indication of a relationship between an input state of the user input device and the range of potential effective input commands.

An aircraft system is also provided that includes one or more effectors capable of influencing at least one of a spatial position and an orientation of an aircraft, at least one user input device to receive an input control command to adjust one or more inertial rates of the aircraft, a display device, one or more onboard systems to provide current aircraft state information, a data storage element maintaining a flight dynamics model associated with the aircraft; and a control module coupled to the display device, the data storage element, the at least one user input device, the one or more onboard systems and the one or more effectors. The control module is configurable to identify one or more effector limits for the one or more effectors based at least in part on the current aircraft state information and current actuation state information for the one or more effectors using the flight dynamics model, determine a range of potential effective input commands for the at least one user input device based on the one or more effector limits, the current aircraft state information and the current actuation state information, and provide a graphical indication of the range of potential effective input commands on the display device.

This summary is provided to describe select concepts in a simplified form that are further described in the Detailed Description. This summary is not intended to identify key or essential features of the claimed subject matter, nor is it intended to be used as an aid in determining the scope of the claimed subject matter.

Furthermore, other desirable features and characteristics of the subject matter described herein will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
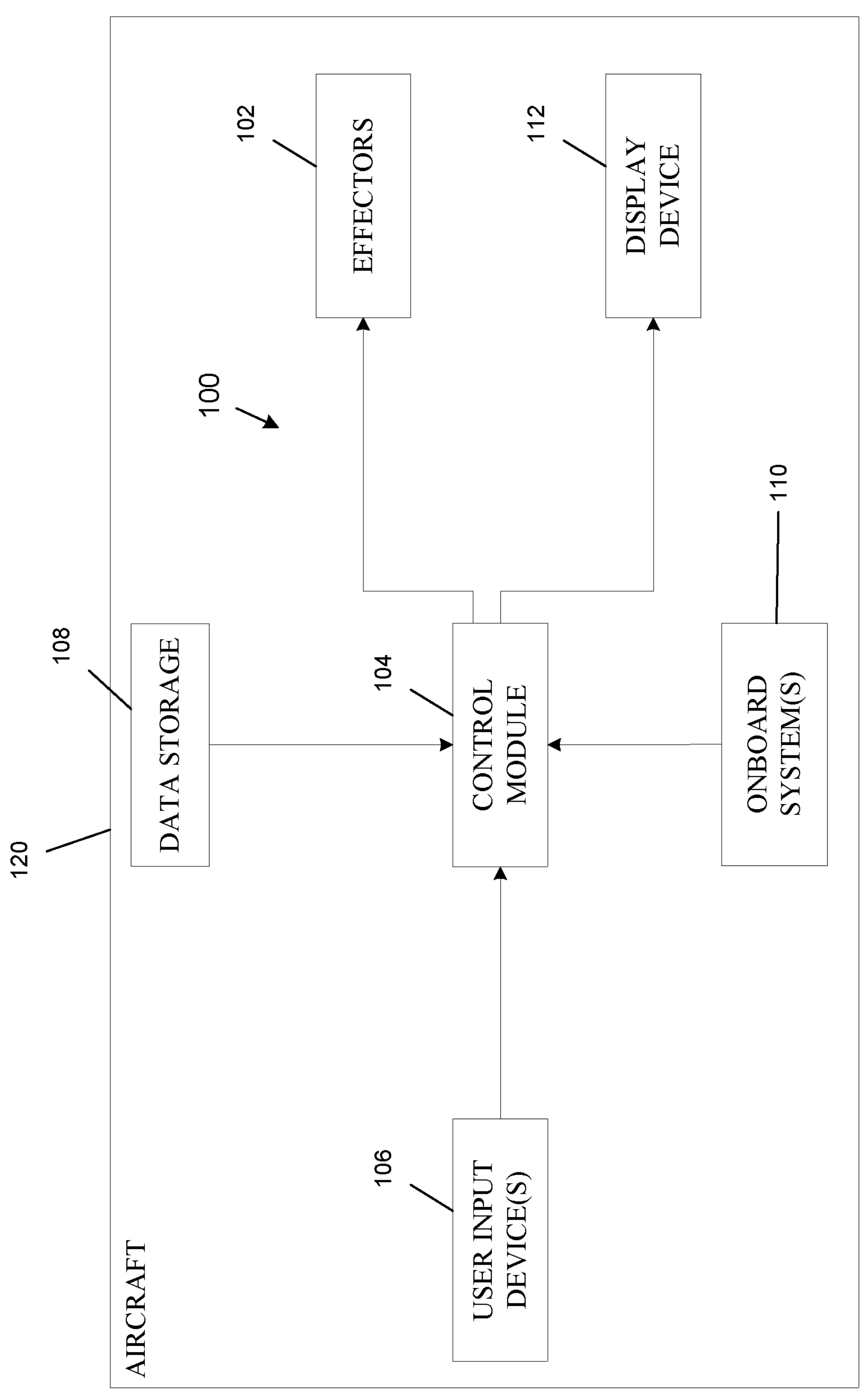
FIG. 1 is a block diagram illustrating a control system suitable for use with an aircraft in accordance with one or more exemplary embodiments.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to systems and methods for assisting operation of an aircraft or other vehicle by providing feedback to a pilot or other vehicle operator regarding the remaining amount of available control margin, that is, the relationship between the current state of a user input device or other control input and the range of potential effective input commands that are capable of producing movement in three-dimensional space before saturating the capabilities of the vehicle with respect to one or more dimensions. In this regard, the control margin represents the remaining control available with respect to the attitude or other spatial attributes or characteristics of the aircraft that are being controlled (e.g., linear and/or angular velocity, acceleration, jerk, etc.) depending on the particular type of control law(s) being implemented with respect to the aircraft (e.g., the potential actuation commands to a controller that result in corresponding commands to the effectors that are within the bounds or limits of the effectors). For purposes of explanation, the subject matter is described herein primarily in the context of a vertical takeoff and landing (VTOL) aircraft where feedback is provided on a flight deck display, an electronic flight bag (EFB) or other cockpit display in an aviation context. However, it should be understood that the subject matter described herein is not necessarily limited to any particular type or configuration of display device, and is not necessarily limited to use with aircraft or avionic applications and may be similarly utilized in other applications, systems or environments, including, but not limited to use with other types of vehicles (e.g., automobiles, marine vessels, trains, etc.).

As described in greater detail below, the subject matter described herein identifies or otherwise determines limits for one or more effectors associated with an aircraft using a flight dynamics model associated with the aircraft as a function of current aircraft state information (e.g., the current aircraft speed, attitude, altitude and/or the like) and current operating state information for the respective effectors (e.g., the current amount of actuation or deflection of a particular effector). For purposes of explanation, an effector should be understood as referring to or otherwise encompassing any sort of actuator or component that is capable of adjusting or otherwise influencing a position or orientation of an aircraft in three-dimensional space, including any sort of flight control components capable of providing lift, drag, propulsion, and/or attitude control for the aircraft, such as, for example, a flight control surface actuator, lift fan, propeller, rotor, motor, turbine, jet engine, aileron, rudder, elevator, spoiler, flap, slat, air brake, or similar flight control component. Based on the current state of the respective effectors and the current aircraft state, the flight dynamics model may be utilized to identify effector limits that define the achievable range of actuation or operation of the respective effectors before saturation, which represents the maximal extent of actuation or operation at which point a respective effector is no longer capable of influencing the position or orientation of the aircraft given the current aircraft state. In this regard, the effector limits represent the range of achievable effector states given the current effector states and the current aircraft state according to the flight dynamics model for the aircraft.

As described in greater detail below, the flight dynamics model is configurable to map an input combination of the current aircraft state and the current effector states to a corresponding set of effector limits and one or more state space matrices, that represent corresponding stability and control derivatives of the aircraft state with respect to actuation of the respective effectors given the current aircraft state and the current effector state. For example, based on the current aircraft velocity, the current aircraft attitude or pitch angle, and the current effector state, the state space matrix may include a row or column corresponding to the amount of translational and/or angular acceleration that is likely to result from actuation of a respective effector based on the estimated or expected airflow given the current aircraft state and the current effector state. Affine mapping and projection performed to translate the effector limits and state space matrices into corresponding translational and angular inertial rate limits, representing the maximum yaw rate and translational linear velocities that are achievable given the current aircraft state and the current effector states. The yaw rate and linear velocity limits are then translated to corresponding control inputs using affine mapping to arrive at a set of limits that define the range of potential effective input commands for an inceptor, joystick or other user input device associated with the effectors that is utilized to adjust the inertial rates of the aircraft. A graphical representation or other user indication of the inceptor limits may be generated or otherwise provided, for example, by depicting the relationship between the current inceptor position or other current control input and the range of potential effective control input commands before saturating the capabilities of the effectors with respect to one or more dimensions, thereby providing a pilot or other vehicle operator with one or more indicia of the control margin (e.g., the relationship between the current inceptor position and the range of potential inceptor positions before saturation).

By virtue of the subject matter described herein, a pilot, co-pilot, crew member or other user onboard a piloted electric vertical takeoff and landing (eVTOL) aircraft is capable of achieving awareness of the control margin (or remaining control available) substantially in real-time in a manner that accounts for the current state of the aircraft, the current state of the effectors, and the current state of the inceptor or other input device. This allows a pilot or other operator to ascertain the feasibility of certain maneuvers and/or infeasibility of maneuvers that might saturate the effectors and impair control, thereby improving the ability of the pilot or other operator to safely and effectively operate the aircraft and facilitating operation to preserve or maintain control margin.

FIG. 1 depicts an exemplary control system 100 suitable for use with an aircraft 120, such as an eVTOL aircraft or other fly-by-wire aircraft. The control system 100 includes, without limitation, one or more effectors 102 that are operable by a control module 104 responsive to an input control command received via a user input device 106 to adjust one or more inertial rates of the aircraft 120, that is, the linear and/or angular velocities of the aircraft 120. In exemplary embodiments, the control module 104 includes, accesses or is otherwise coupled to a data storage element 108 that maintains one or more flight dynamics models associated with the aircraft 120 that are utilizable by the control module 104 to determine corresponding actuation commands for operating the effectors 102 responsive to a particular input control command given the current state of the aircraft 120. In this regard, in exemplary implementations, the control module 104 is communicatively coupled to one or more systems 110 onboard the aircraft 120 to receive information characterizing the current operating state of the aircraft 120, including, but not limited to, indication of the current altitude of the aircraft 120, the current attitude of the aircraft 120, the current speed or velocity of the aircraft 120, the current configuration of the aircraft 120, and/or the like. It should be appreciated that FIG. 1 depicts a simplified representation of a control system 100 for purposes of explanation and is not intended to be limiting.

The effectors 102 generally represent the actuatable physical or mechanical components of the aircraft 120 that are capable of influencing the movement of the aircraft 120 in three-dimensional space, that is, the linear position of the aircraft 120 and the angular position or orientation of the aircraft 120. For example, the effectors 102 may include, but are not limited to, one or more lift fans, propellers, rotors, motors, turbines, engines, throttles, ailerons, rudders, elevators, spoilers, flaps, slats, air brakes, flight control surfaces, flight control surface actuators, or any other suitable flight control component. Depending on the particular type and configuration of a particular effector 102, that particular effector 102 has associated therewith one or more limits on the range or amount of actuation of the effector 102, typically an upper limit and a lower limit, which may vary depending on the current state of the aircraft 120 and/or the current state of one more other effectors 102. For example, an effector 102 may have one or more physical limits corresponding to the maximum range of positions or states which the effector 102 can be actuated to. In addition to physical limits, an effector 102 may have practical or operational limits, which may further limit the range of positions or states in which the effector 102 can be operated depending on the current state of the aircraft 120 and/or the current state of one more other effectors 102, for example, based on the estimated airflow that the effector 102 is subjected to given the current state of the aircraft 120 and/or the current state of one more other effectors 102, whether or not the actuation of the effector 102 may inhibit airflow to and/or actuation of another effector 102, and/or the like.

The user input device 106 generally represents the one or more hardware, software, and/or firmware components that are coupled to the control module 104 and cooperatively configured to allow a user (e.g., a pilot, co-pilot, or crew member) to control operation of the effectors 102 via the control module 104. In exemplary embodiments, the user input device 106 is realized as one or more inceptors, collective stick grips or other joysticks that can be manipulated in a Cartesian coordinate reference frame (for example, right, left, forward (or up), reverse (or down), diagonally and/or the like). In various embodiments, the user input device 106 also includes or is realized as one or more pedals, hydraulics, levers or the like that can be manipulated or actuated linearly. In this regard, a joystick-type user input device 106 may be utilized by the pilot to control the attitude, orientation or angular position of the aircraft 120, while a pedal or other linear actuator may be utilized by the pilot to control the thrust or linear position of the aircraft 120. That said, in various other embodiments, the user input device 106 may include or be realized as any sort of keypad, touchpad, keyboard, mouse, touch panel (or touchscreen), joystick, knob, line select key or another suitable device adapted to receive input from a user.

The onboard systems 110 generally represent any sort of avionics system(s) capable of providing data and/or information regarding the operation of the aircraft, such as, for example, a flight management system (FMS), a navigation system, an inertial reference system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system. In this regard, the onboard systems 110 may be communicatively coupled to the control module 104 via an avionics bus or a communications network to provide current aircraft state information to the control module 104, including, but not limited to, values or other indicia of the current attitude of the aircraft 120 (e.g., the current roll, pitch and/or yaw of the aircraft 120), the current altitude of the aircraft 120, the current speed or velocity of the aircraft 120 (e.g., the current airspeed, the current vertical speed, and/or the like) and the current configuration of the aircraft 120, which may include indicia of the current configuration or state of the effectors 102.

Still referring to FIG. 1, the control module 104 generally represents a flight control computer or other combination of one or more processors, central processing units (CPUs), controllers, microprocessors, microcontrollers, processing cores and/or other hardware computing resources configured to translate or otherwise convert input control commands received via the user input device(s) 106 into corresponding actuation commands for the effectors 102. For example, a pilot or other operator of the aircraft 120 may manipulate one or more inceptors or other human-machine interfaces to provide an input control command indicative of desired linear velocities for the aircraft 120 (e.g., in the north, east, and vertical directions) and a desired yaw rate for adjusting the angular position of the aircraft 120, where the control module 104 translates the desired linear velocities and angular rate into a corresponding set of effector commands for operating the effectors 102 to produce the desired linear velocities and angular rate based on the current aircraft state and the current effector states at the time of the input control commands.

In exemplary implementations, the control module 104 is coupled to a data storage element 108 that maintains one or more flight dynamics models associated with the aircraft 120 which may be utilized to derive effector state matrices and aircraft state space matrices for mapping an input control command vector including the desired linear velocities and angular rates into a corresponding vector or matrix of effector commands to produce the desired linear velocities and angular rates. In one implementation, the flight dynamics model is realized as a lookup table configured to output or otherwise populate the effector state matrices and aircraft state space matrices with appropriate values as a function of the current effector states and the current aircraft state input to the flight dynamics model. The control module 104 then utilizes the resulting effector command vector or matrix to provide corresponding actuation commands to the effectors 102 (or the actuators associated therewith) to influence the linear and angular movement of the aircraft 120 responsive to the input control commands.

For example, a state space model of the aircraft 120 can be expresses as xdot=Ax+Bu and y=Cx, where x is a vector of measured states, y is a vector of controlled variables and u is a vector representing effector commands. The aircraft state space model can be rewritten into a single equation for the controlled variable derivatives, which correspond to the outputs of the desired dynamics proportional-integral (PI) control loops, as $\dot{y}=C\dot{x}=CAx+CBu$, which in turn, can be rewritten to express u as $u=CB^{-1}(\dot{y}-CAx)$. The relationship between controlled variables y and effector command u can be utilized to populate values for the effector command vector (or effector state matrix) with appropriate values as a function of the current control command y and the current aircraft state x. Although the foregoing describes a simplified relationship for the control allocation to the effector commands u using a linear state space model, in practice, the control law may be implemented as a non-linear equivalent.

Depending on the embodiment, the control module 104 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The control module 104 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the control module 104 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the control module 104, or in any practical combination thereof. For example, the data storage element 108 (or memory), which may be realized as any sort of non-transitory short or long term storage media, may be capable of storing code or other computer-executable programming instructions for execution by the control module 104 that, when read and executed by the control module 104, cause the control module 104 to support or otherwise perform certain tasks, operations, functions, and/or processes described herein. Depending on the embodiment, the data storage element 108 may be physically realized using RAM memory, ROM memory, flash memory, registers, a hard disk, or another suitable data storage medium known in the art or any suitable combination thereof.

In one or more exemplary implementations, the control module 104 is coupled to a display device 112 or other output device capable of providing user notifications or other indicia to the pilot or other aircraft operator that depict or are otherwise influenced by the remaining amount of control margin that is available to the pilot, that is, the relationship between the current or most recent input control command corresponding to the current input state of the user input device(s) 106 (e.g., the current amount of actuation of an inceptor) and the range of potential effective input control commands that are capable of exhibiting the desired linear and/or angular movement of the aircraft 120 before saturating the effectors 102 in a particular direction or dimension. In this regard, the display device 112 may be realized as an electronic display capable of graphically displaying flight information or other data associated with operation of the aircraft 120 generated by the control module 104. The display device 112 may be configured to support multi-colored or monochrome imagery, and could include or otherwise be realized using a liquid crystal display (LCD), a light emitting diode (LED) display, an organic light emitting diode (OLED) display, a heads-up display (HUD), a heads-down display (HDD), a plasma display, a projection display, a cathode ray tube (CRT) display, or the like.

Figure 2:
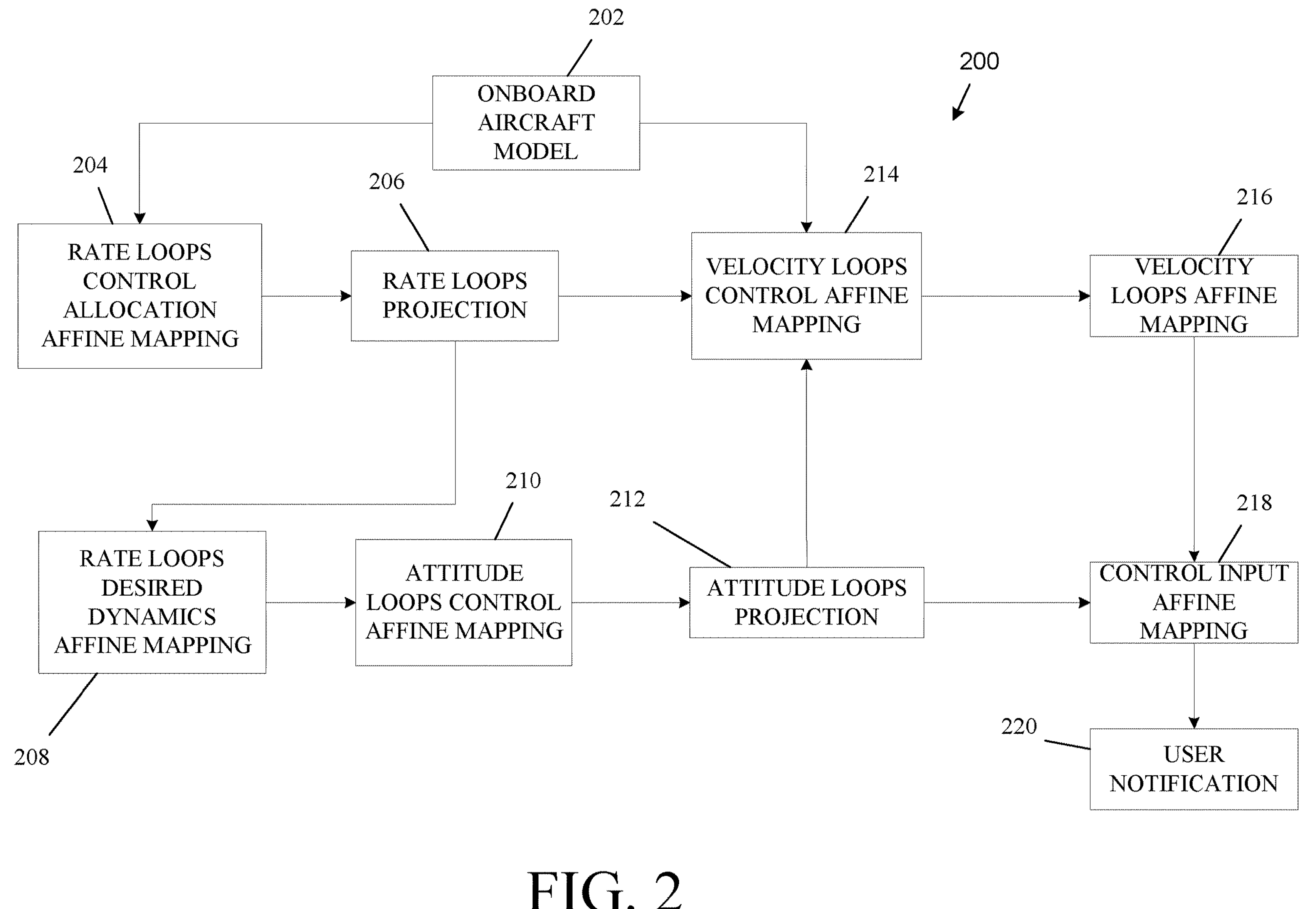
FIG. 2 is a block diagram of a control margin determination service suitable for implementation in connection with the control system of FIG. 1 in an exemplary embodiment.

Referring now to FIG. 2 with continued reference to FIG. 1, in exemplary implementations, the control module 104 is configurable to implement or otherwise support a control margin determination service 200 that is capable of calculating or otherwise determining the range of potential effective input control commands achievable by the aircraft 120 given the current aircraft state and the current effector states. The control margin determination service 200 utilizes the flight dynamics model 202 maintained by the data storage element 108 to identify or otherwise obtain an effector limit matrix and a control derivative matrix for the aircraft 120 as a function of the current aircraft state information received from the onboard avionics systems 110 and the current effector states resulting from the preceding effector actuation commands. In this regard, the actuation commands previously generated by the control module 104 for operating the effectors 102 responsive to an input control commands received via the user input device(s) 106 may be fed back into the control margin determination service 200 as input variables to a lookup table of the flight dynamics model 202 along with the current values for the various different aircraft state parameters provided as input variables to the lookup table of the flight dynamics model 202.

For a given combination of effector states and a concurrent aircraft state defined by a combination of the current aircraft attitude, the current aircraft altitude, the current aircraft speed or velocity, and/or the like, the flight dynamics model 202 is configurable to output an effector limit matrix that identifies the maximum and/or minimum actuation, deflection or operation of each respective effector 102 based on the contemporaneous state of that respective effector 102 in relation to the contemporaneous states of other effectors 102 and the contemporaneous aircraft state. In this regard, a particular row or column of the effector limit matrix may include one or more values corresponding to the potential range of actuation or operation of that respective effector 102, where the full set of values corresponding to the potential range of actuation or operation for each of the respective effectors 102 corresponds to the effector limit matrix. For example, in practice, effector limits may dynamically vary depending on the current aircraft state (e.g., range of motion of tiltable rotors may be limited depending on aircraft speed) or the current state of other effectors (e.g., to prevent obstructing airflow to neighboring rotors, etc.), such that the values in the effector limit matrix correspond to the range of potential effector states that are allowed and calculated substantially in real-time based on the current effector states and current aircraft state.

In a similar manner, for the input combination of effector states and a concurrent aircraft state, the flight dynamics model 202 is configurable to output a control derivative matrix that identifies the maximum and/or minimum derivatives or rates of change with respect to the spatial position of the aircraft 120. In this regard, given the current aircraft state and the current effector states, the control derivative matrix represents stability and control derivatives corresponding to how inertial forces or moments will change responsive to effector actuation, deflection or operation from the current effector state given the contemporaneous states of other effectors 102 and the contemporaneous aircraft state. For example, given the current aircraft linear velocities and pitch angle and the resulting airflow with respect to a particular effector 102, the control derivative matrix may include one or more values that represent or are otherwise proportional or correlative to the amount of thrust, lift, drag, or other inertial force that would be generated by the airflow and the resulting downward pitching moments or upward lift caused by varying the state of a respective effector 102.

The effector limit matrix and the control derivative matrix is output or otherwise provided from the flight dynamics model 202 to a rate loops control allocation affine mapping component 204 that is configurable to receive the preceding effector commands (e.g., the actuation commands previously generated by the control module 104 for operating the effectors 102 that are fed back to the control margin determination service 200) and utilize the relationship (or difference) between the preceding effector commands and the effector limits to perform a set of affine mappings to generate a rate loops envelope matrix that represents the range of achievable angular rates and linear velocities for the aircraft 120 from the current aircraft state and corresponding inceptor inputs given the control derivative matrix and the potential actuation of the effectors 102 from the current effector states to the current effector limits indicated by the effector limit matrix. In this regard, the output of the rate loops control allocation affine mapping component 204 is realized as an achievable rate matrix that represents the envelope or potential range of achievable angular accelerations for the aircraft 120 and achievable translational accelerations for the aircraft 120.

The achievable rate envelope matrix output by the rate loops control allocation affine mapping component 204 is input or otherwise provided to a rate loops projection component 206 that is configurable to receive the current or preceding angular accelerations and translational accelerations of the aircraft 120 resulting from the actuation commands previously generated by the control module 104. The rate loops projection component 206 utilizes the relationship (or difference) between the achievable rate envelope matrix and the current rate matrix to identify corresponding limits on the angular accelerations and translational accelerations given the current angular accelerations and current translational accelerations and the potential range for the angular and translational accelerations. In this regard, the rate loops projection component 206 outputs or otherwise provides a first vector or matrix of angular rate limits that represents the estimated range of angular acceleration limits based on the relationship or difference between the angular rates of the achievable rate envelope matrix and the current angular rates for the aircraft 120 given the current aircraft state and the current effector state, and a second vector or matrix that represents the estimated range of linear acceleration limits based on the relationship or difference between the linear accelerations of the achievable rate envelope matrix and the current linear accelerations for the aircraft 120 given the current aircraft state and the current effector state. For purposes of explanation, the rate loops projection component 206 can be represented by a simplified equation $Z(t)=A(t)U+b(t)$, where $Z(t)$ represents the achievable rate envelope matrix, U is a matrix representing the effector limits, $A(t)$ represents a linear part of the transformation and $b(t)$ represents the affine part of the transformation, where the affine mapping defined by $A(t)$ and $b(t)$ depends on the current state of the aircraft (e.g., based on data from the onboard systems 110 and/or the data storage element 108 at time t. In this regard, at each sample time, the module 204 receives as input the updated affine map ($A(t)$ and $b(t)$) from the onboard aircraft model 202 and the time invariant effector limit matrix U.

In the illustrated implementation, the angular rate limits determined by the rate loops projection component 206 are input to a rate loops desired dynamics affine mapping component 208 that is configured to map or otherwise translate the estimated angular rate limits into corresponding estimated limits on the angular velocity of the aircraft 120. The estimated angular velocity limits output by the rate loops desired dynamics affine mapping component 208 are input to an attitude loops control allocation and desired dynamics affine mapping component 210 that is configured to map or otherwise translate the estimated angular velocity limits into an estimated range or envelope of achievable roll, pitch and yaw angles for the aircraft 120, which may alternatively be referred to as the estimated attitude envelope matrix. The estimated envelope of roll, pitch and yaw angles is input or otherwise provide to an attitude loops projection component 212 that utilizes the relationship (or difference) between the attitude envelope matrix and the current attitude matrix including the current values for the roll, pitch and yaw angles resulting from the preceding effector commands to calculate or otherwise determine corresponding limits on the roll, pitch and yaw angles for the aircraft 120.

In exemplary implementations where the user input device(s) 106 are operable to control the linear velocities and yaw angle of the aircraft 120, the estimated limits on the roll and pitch angles for the aircraft 120 are input to a velocity loops control affine mapping component 214 that utilizes the estimated roll and pitch angle limits from the attitude loops projection component 212, the estimated linear acceleration limits from the rate loops projection component 206, and the control derivative matrix provided by the onboard aircraft model 202 to calculate or otherwise determine estimated three-dimensional linear acceleration limits for the aircraft 120, for example by multiplying the roll and pitch angles from the attitude loops projection by thrust and mass values from the onboard aircraft model 202 and adding the result to the estimated linear acceleration limits from the rate loops projection component 206 for a vector sum of the limits of the accelerations to obtain three-dimensional acceleration limits in Earth axes (North, East and altitude). The estimated three-dimensional linear acceleration limits are input or otherwise provided to a velocity loops desired dynamics affine mapping component 216 that translates or otherwise converts the three-dimensional linear acceleration limits into corresponding velocity limits in an equivalent manner to the rate loops control allocation affine mapping.

Still referring to FIG. 2, the resulting three-dimensional linear velocity limits determined by the velocity loops desired dynamics affine mapping component 216 and the yaw angle limits determined by the attitude loops projection component 212 are input or otherwise provided to a control input affine mapping component 218. The control input affine mapping component 218 maps, translates, or otherwise converts the combination of linear velocity limits and yaw angle limits into corresponding limits for the range of potential input control commands capable of exhibiting their intended effect of producing respective combinations of linear velocities and yaw angles that are maintained within the envelope or range defined by the linear velocity limits and yaw angle limits. For example, in one implementation, the control input affine mapping component 218 maps the combination of three-dimensional linear velocity limits and yaw angle limits into corresponding limits of actuation of an inceptor, joystick or similar two-dimensional user input device 106. Similarly, the control input affine mapping component 218 may map the combination of three-dimensional linear velocity limits and yaw angle limits into corresponding limits of actuation of a pedal or other linearly actuatable user input device 106 capable of controlling the thrust produced by the effectors 102 of the aircraft 120 in concert with the two-dimensional limits on the actuation of the inceptor, joystick or similar two-dimensional user input device 106. In this manner, the control input affine mapping component 218 utilizes the three-dimensional linear velocity limits and yaw angle limits with respect to inertial reference frames associated with the aircraft 120 to identify a corresponding envelope or range of effective potential input control commands with respect to the actuation reference frames associated with the relevant user input device(s) 106. In this regard, the envelope or range of effective potential input control commands represents the potential input states (or combination of input states) of the user input device(s) 106 that are capable of producing or otherwise influencing movement of the aircraft 120 or otherwise exhibiting a desired effect without saturating the effectors 102 or losing ability of the input control command to produce a corresponding response by the aircraft 120.

For purposes of affine mapping and projection for translating effector states or limits and state space matrices into corresponding rate limits, a polyhedron corresponding to the range of potential effector states, in half-space representation, is defined as an intersection of a finite number of closed half-spaces, represented by the following equation: $\mathcal{P}=\{x\in\mathbb{R}^{n_x}\mid P^x x\le P^c\}$, where $P^x\in\mathbb{R}^{m\times n_x}$ and $P^c\in\mathbb{R}^m$ defines the system of m inequalities of form $$p_i^{x^T} x \le p_i^c \text{ for } i = 1, \dots, m \text{ with}$$

$$p_i^{x^T}$$

being the i-th row of the matrix $P^x$. The polyhedron, in the vertex representation, is defined as $$\mathcal{P} = \left\{\sum_{i=1}^{n_v} \lambda_i v_i \middle| \sum_{i=1}^{n_v} \lambda_i = 1, \lambda_i \ge 0, i = 1, \dots, n_v\right\},$$

where $v_i\in\mathbb{R}^{n_x}$, with $i=1, \ldots, n_v$, are vertices of the polyhedron $\mathcal{P}$. For simplicity, it can be assumed that $\mathcal{P}$ is a bounded set, that is, a polytope, corresponding to the restrictions on the effectors. For affine mapping, a function f(z) is defined as $f: z\in\mathbb{R}^{n_z}\mapsto Az+b$, where $A\in\mathbb{R}^{m_f\times n_z}$ and $b\in\mathbb{R}^{m_f}$. If $m_f=n_x$ then $\mathcal{P}f=\{z\in\mathbb{R}^{n_z}\mid P^x f(z)\le P^c\}=\{z\in\mathbb{R}^{n_z}\mid P^x Az\le P^c-P^x b\}$. By assuming $n_z=n_x$ then $f\circ\mathcal{P}=\{y\in\exists\mid\exists p\in\mathcal{P}, y=Ap+b\}$. If $\mathcal{P}$ is in the vertex representation, then the f and $\mathcal{P}$ composition can be solved as a convex hull of all mapped vertices via $f\circ\mathcal{P}=\text{conv}(\{Av_1+b, \ldots, Av_k+b\})$. To avoid vertex enumeration, substituting the argument from the affine polyhedron expression as $x=A^{-1}y-A^{-1}b$, yielding $f\circ\mathcal{P}=\{y\in\mathbb{R}^{m_f}\mid P^x A^{-1}y\le P^c+P^x A^{-1}b\}$. By defining $\bar{x}\in\mathbb{R}^n$ and $\hat{x}\in\mathbb{R}^m$ such that $[\bar{x}^T\ \hat{x}^T]^T\in\mathbb{R}^{n_x}$, then the polyhedron can be rewritten as $\mathcal{P}=\{[\bar{x}^T\ \hat{x}^T]^T\in\mathbb{R}^{n+m}\mid P^{\hat{x}}\hat{x}\le P^c\}$. The projection onto the $\bar{x}$-space is then defined as $\text{proj}_{\bar{x}}(\mathcal{P})=\{\bar{x}\in\mathbb{R}^n\mid\exists\,\hat{x}\in\mathbb{R}^m, P^{\hat{x}}\hat{x}+P^{\bar{x}}\bar{x}\le P^c\}$, where the polyhedron slice onto the $\bar{x}$-space can be defined as $\text{slice}_{\bar{x}}(\mathcal{P})=\{\bar{x}\in\mathbb{R}^n\mid\hat{x}\in\mathbb{R}^m, P^{\hat{x}}\hat{x}+P^{\bar{x}}\bar{x}\le P^c\}$, where there is a specific vector $\hat{x}$ for which the projection is performed. Given boundaries of all effectors in form of a polyhedron set forth above, $u\in\mathcal{U}=\{u\in\mathbb{R}^{n_u}\mid P^u u\le P^c\}$, and dynamics of the subsystem f(c), effector values $u\in\mathbb{R}^{n_u}$ can be computed based on input signals $c\in\mathbb{R}^{n_c}$ under an affine mapping $u=Ac+b$. The signal c is constructed by merging two other signals $c_{pqr}\in\mathbb{R}^n$ and $c_{uthrot}\in\mathbb{R}^m$, and thus $$c = \left[c_{pqr}^T c_{uthrot}^T\right]^T$$

$\in\mathbb{R}^{n+m}$, where $c_{pqr}$ is solution of another affine mapping $g(y_{pqr})$ defined as $c_{pqr}=\bar{A}y_{pqr}+\bar{b}$, where $y_{pqr}\in\mathbb{R}^p$.

Figure 3:
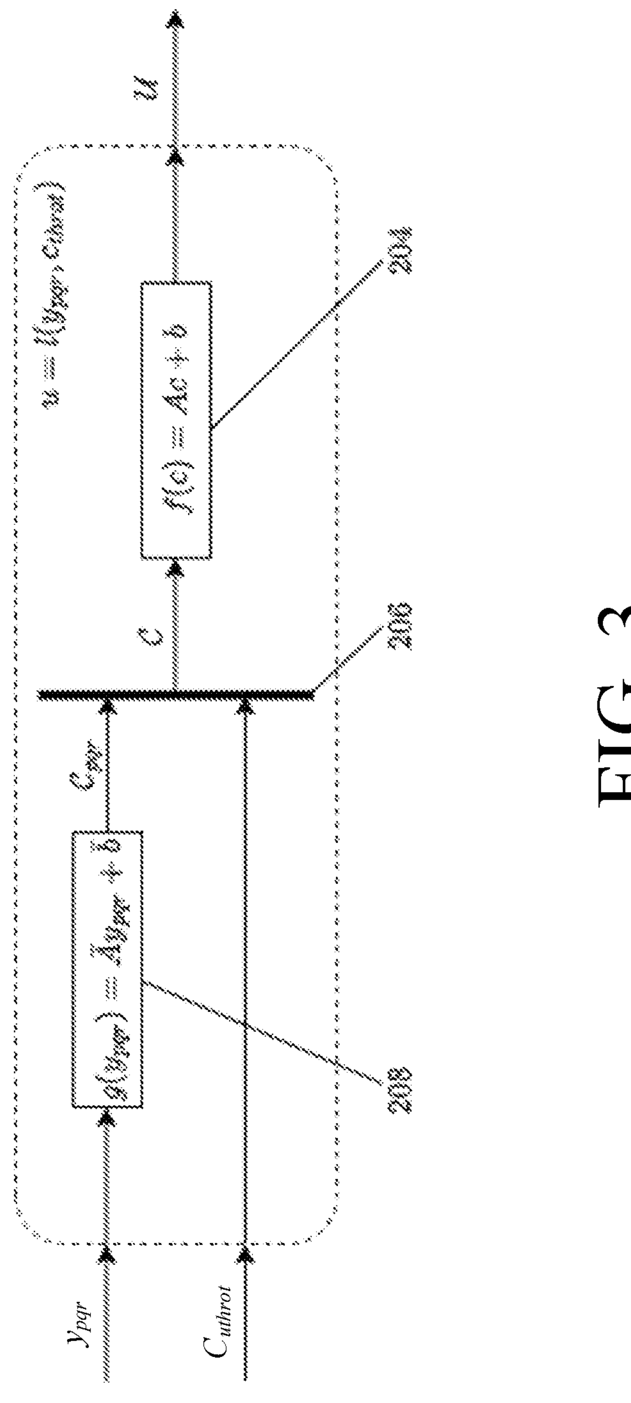
FIG. 3 is a block diagram depicting an exemplary relationship of the affine mapping between effector commands and desired attitude and velocity commands in accordance with one or more embodiments.

FIG. 3 depicts an exemplary relationship of the model dynamics and affine mapping relationship between u, which represents the effector commands, and the attitude angular velocity commands ($y_{pqr}$) and desired linear rates ($c_{uthrot}$). In this regard, the rate loops control allocation affine mapping 204 is configured to perform the inverse functionality of the depiction in FIG. 3 to arrive at c, which represent the rate loops envelope matrix that represents the range of achievable angular and linear rates for the aircraft 120 derived from the preceding effector commands u, while the rate loops projection component 206 is configured to perform the inverse functionality of the depiction in FIG. 3 derive the angular rate limits ($c_{pqr}$) and linear velocity limits ($c_{uthrot}$), where the rate loops desired dynamics affine mapping component 208 performs the inverse functionality to arrive at the estimated limits on the angular velocity of the aircraft 120 ($y_{pqr}$).

Assuming that the vectors of $c_{pqr}$ and $c_{uthrot}$ from the previous sample instant are given and denoted by $$c_{pqr}^-$$

and $$c_{uthrot}^-,$$

respectively, the control input affine mapping component 218 attempts to determine which vectors $y_{pqr}\in\mathbb{R}^p$ and $c_{uthrot}\in\mathbb{R}^m$ can be used such that effectors are within given boundaries of $\mathcal{U}$. To solve the problem, the known polyhedron $\mathcal{U}$ is propagated through the model dynamics depicted in FIG. 3 in the reverse direction, by perform multiple affine mappings and projections to obtain $\mathcal{Y}_{pqr}$ and $\mathcal{C}_{uthrot}$. As a first step, a set of a set of all feasible vectors c is computed using the foregoing equations to arrive at $\mathcal{C}=\{c\in\mathbb{R}^{n_c}\mid P^u Ac\le P^c-P^u b\}=\{c\in\mathbb{R}^{n_c}\mid P^\alpha c\le P^\beta\}$. Performing vector composition in the reverse direction results in splitting the vector $c\in\mathbb{R}^{n+m}$ into its respective sub-spaces $c_{pqr}\in\mathbb{R}^n$ and $c_{uthrot}\in\mathbb{R}^m$ (e.g., by projecting the set $\mathcal{C}$ onto respective sub-spaces). That said, when previous values of vectors $c_{pqr}$ and $c_{uthrot}$ are available, a less conservative slice projection can be performed as follows:

$$C_{pqr} = \text{slice}_{c_{pqr}}(C) = \left\{c_{pqr} \in \mathbb{R}^n \middle| c_{uthrot} = c_{uthrot}^-, P_i^\alpha c_{pqr} + P_j^\alpha c_{uthrot} \le P^\beta\right\}$$

and $$C_{uthrot} = \text{slice}_{c_{uthrot}}(C) = \left\{c_{uthrot} \in \mathbb{R}^m \middle| c_{pqr} = c_{pqr}^-, P_i^\alpha c_{pqr} + P_j^\alpha c_{uthrot} \le P^\beta\right\},$$

with $i=1, \ldots, n$ and $j=(n+1), \ldots, (n+m)$, where $$P_i^{\alpha} \text{ and } P_j^{\alpha}$$

denotes respective columns of the matrix $P^{\alpha}$. The affine mapping of $\mathcal{C}_{pqr}$ onto y-space is then performed with the simplification $\mathcal{C}_{pqr}=\{c_{pqr} \in \mathbb{R}^n \mid P^{\gamma} c_{pqr} \leq P^{\delta}\}$ to define the affine mapping $g(y_{pqr})$ (e.g., $g \circ \mathcal{C}_{pqr}$) as $\mathcal{Y}_{pqr}=\{y_{pqr} \in \mathbb{R}^p \mid P^{\gamma} \overline{A} y_{pqr} \leq P^{\delta}+P^{\gamma} b\}$. The result may be verified by parsing the computed set through the system dynamics shown in FIG. 3 in the forward direction to confirm the resulting polyhedron is within given effector boundaries $\mathcal{U}$, represented by $l(\mathcal{Y}_{pqr}, \mathcal{C}_{uthrot}) \subseteq \mathcal{U}$ where $l(\cdot)$ denotes the model dynamics. In exemplary implementations the set $l(\mathcal{Y}_{pqr}, \mathcal{C}_{uthrot})$ is a lower dimensional set within $\mathcal{U}$, where validation points corresponding to vertices of the polyhedral $\mathcal{Y}_{pqr}$ and $\mathcal{C}_{uthrot}$, represented as $v_i \in \mathbb{R}^{p+n}$, satisfy $l(v_i) \in \mathcal{U}$, $\forall v_i \in \mathcal{Y}_{pqr} \cup \mathcal{C}_{uthrot}$.

Referring again to FIG. 2, in exemplary implementations, the computed envelopes identifying the range of potential effective input control commands are provided to a user notification component 220 that is configurable to generate or otherwise provide one or more indicia of the range of potential effective input commands available to the pilot or other operator of the aircraft 120. For example, the user notification component 220 may generate or otherwise provide a graphical user interface (GUI) on the display device 112 that graphically depicts the relationship between the current input state of a user input device 106 and a range of potential effective input commands for the user input device 106, for example, by providing a two-dimensional representation of the current position or state of an inceptor, joystick or other two-dimensional user input device 106 with respect to a two-dimensional region or space corresponding to the envelope or range corresponding to the limits of actuation of the respective inceptor, joystick or other two-dimensional user input device 106 before saturating one or more effectors 102.

It should be noted the subject matter described herein is not limited to graphical user indicia, and in practice, various different forms of user indicia may be provided, including, but not limited to, physical, haptic, tactile and/or auditory user indicators. For example, in some implementations, the control module 104 may be configured to influence the range of motion of a particular user input device 106 or configure the user input device 106 to provide increased resistance or other physical feedback to the pilot or other operator that indicates the input control command is approaching a limit or boundary of the envelope of potential effective input control commands associated with the respective user input device 106. In yet other implementations, the control module 104 may be configured to cause a particular user input device 106 to vibrate or otherwise provide haptic feedback when the input state of the respective user input device 106 reaches (or is within a threshold distance of reaching) a boundary or maximal extent of the range of potential input control command states for that respective user input device 106. Similarly, some implementations may provide auditory feedback when the input state of a respective user input device 106 reaches or approaches the boundary or maximal extent of the range of potential effective input control command states for that respective user input device 106. In other implementations, the user notification component 220 may utilize scaling or other prorating of a user input device 106 such that full actuation or deflection of the user input device 106 would correspond to the respective effector limits at the current point in time for the current aircraft state and current effector state(s) to maintain proportionality between the percentage or amount of actuation of a user input device 106 and the corresponding percentage or amount of response capable of being provided by the respective effector(s) 102. Accordingly, it will be appreciated the subject matter described herein is not limited to any particular type, number or configuration of user indicia that may be provided to indicate the relationship between the current or prospective input state of a user input device 106 and the current envelope or range of potential effective input commands for that user input device 106 given the current aircraft state and the current state of the effectors 102.

Figure 4:
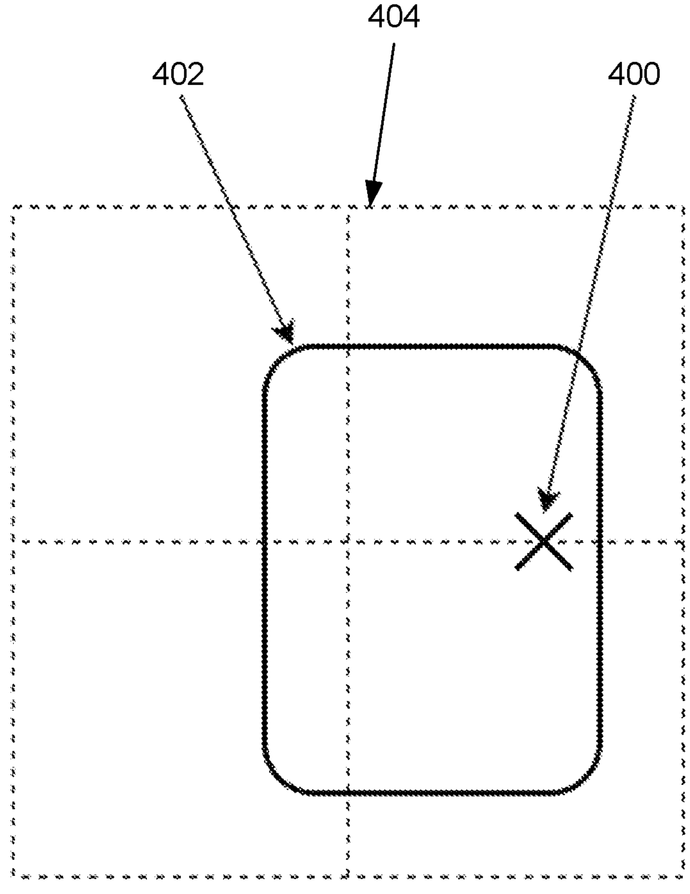
FIG. 4 depicts an exemplary graphical user interface (GUI) display suitable for presentation on a display device in connection with the control margin determination service of FIG. 2 in an exemplary embodiment.

FIG. 4 depicts an exemplary graphical user interface (GUI) display suitable for presentation by the user notification component 220 of the control margin determination service 200 at the control module 104 on the display device 112 that includes a graphical representation of the current actuation state 400 of the user input device 106 positioned with respect to a graphical representation of the envelope 402 corresponding to the limits of actuation of the user input device 106 before saturating one or more effectors 102. In this manner, the user notification component 220 of the control module 104 provided situational awareness of the remaining available control margin (e.g., the distance or difference between the position of the current actuation state indication 400 and a nearest boundary of the control envelope 402). The GUI display may also include a graphical representation of the full actuation range 404 of the user input device 106 to provide situational awareness of the current actuation state of the user input device 106 and the relationship between the current state of the control envelope 402 and the full actuation range 404. It should be appreciated that the GUI display depicted in FIG. 4 dynamically updates for each iteration or update of the control margin determination service 200 at the update rate or sampling frequency associated with the control margin determination service 200 obtaining updated data from the user input devices 106 and onboard systems 110 to reflect the remaining control margin given the current state of the aircraft 120 substantially in real-time.

By virtue of the subject matter described herein, a pilot or other crew member operating an aircraft is provided indication in situations or flight conditions in which input control commands are approaching their limits of effectiveness, thereby allowing the pilot or other operator to perform actions to maintain controlled operation of the aircraft. This is advantageous for aircraft, such as eVTOL aircraft that do not have dedicated effectors for each axis or other fly-by-wire aircraft that lack direct mechanical coupling between control input devices and corresponding flight control surfaces, where a pilot or other operator would otherwise lack control margin awareness. In addition to the capability to display the remaining available control margin, various implementations may support scaling, limiting or otherwise constraining inceptors, joysticks, throttles, pedals or the like, such that the pilot or other operator does not input control commands that cannot be realized by the effector(s) and/or the aircraft. In this regard, maneuverability and operation of the aircraft is improved and simplified by facilitating input control commands from a pilot being maintained within the achievable envelope for the aircraft.

For the sake of brevity, conventional techniques related to display systems, avionics systems, fly-by-wire systems, flight control laws, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC.

The subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of assisting operation of an aircraft using a user input device for adjusting one or more inertial rates of the aircraft, the method comprising:

obtaining current aircraft state information;

obtaining current actuation state information for a plurality of effectors associated with the aircraft;

identifying effector limits for saturating respective effectors of the plurality of effectors based at least in part on the current aircraft state information and the current actuation state information using a flight dynamics model associated with the aircraft;

determining a first range of achievable accelerations for the aircraft based at least in part on a relationship between the effector limits for saturating the respective effectors of the plurality of effectors and the current actuation state information;

determining a range of potential effective input states for the user input device associated with the plurality of effectors to adjust the one or more inertial rates of the aircraft before saturating one or more effectors of the plurality of effectors based on the first range of achievable accelerations, wherein the range of potential effective input states comprises a subset of a full actuation range of the user input device;

providing a graphical user interface (GUI) display including a graphical representation of the full actuation range of the user input device with respect to a second graphical representation of the range of potential effective input states; and providing a third graphical representation of a current input state of the user input device with respect to the second graphical representation of the range of potential effective input states and the graphical representation of the full actuation range on the GUI display.

2. The method of claim 1, the current actuation state information comprising one or more preceding effector commands, wherein determining the range of potential effective input states comprises:

determining the first range of achievable accelerations for the aircraft based on a relationship between the effector limits and the one or more preceding effector commands;

determining a second range of achievable attitudes for the aircraft based at least in part on the first range of achievable accelerations;

determining a third range of achievable translational velocities for the aircraft based at least in part on a subset of translational acceleration limits of the first range of achievable accelerations and the second range of achievable attitudes for the aircraft; and converting the second range of achievable attitudes and the third range of achievable translational velocities to the range of potential effective input states.

3. The method of claim 2, wherein converting the second range of achievable attitudes and the third range of achievable translational velocities to the range of potential effective input states comprises:

identifying a yaw angle limit based at least in part on the second range of achievable attitudes; and affine mapping the yaw angle limit and the third range of achievable translational velocities to a range of effective input states for the user input device.

4. The method of claim 1, wherein the aircraft comprises a vertical takeoff and landing (VTOL) aircraft.

5. The method of claim 1, wherein:

the current actuation state information comprises a current effector state for the plurality of effectors;

the effector limits comprise a range of achievable effector states associated with the plurality of effectors; and the flight dynamics model is configured to map a combination of the current aircraft state information and the current effector state for the plurality of effectors to one or more state space matrices.

6. A non-transitory computer-readable medium having computer-executable instructions stored thereon that, when executed by a processing system, cause the processing system to:

obtain current aircraft state information;

obtain current actuation state information for a plurality of effectors associated with an aircraft;

identify effector limits for saturating respective effectors of the plurality of effectors based at least in part on the current aircraft state information and the current actuation state information using a flight dynamics model associated with the aircraft;

determine a first range of achievable accelerations for the aircraft based at least in part on a relationship between the effector limits for saturating the respective effectors of the plurality of effectors and the current actuation state information;

determine a range of potential effective input states for a user input device associated with the plurality of effectors to adjust one or more inertial rates of the aircraft before saturating one or more effectors of the plurality of effectors based on the first range of achievable accelerations, wherein the range of potential effective input states comprises a subset of a full actuation range of the user input device;

provide a graphical user interface (GUI) display including a graphical representation of the full actuation range of the user input device with respect to a second graphical representation of the range of potential effective input states; and provide a third graphical representation of a current input state of the user input device with respect to the second graphical representation of the range of potential effective input states and the graphical representation of the full actuation range on the GUI display.

7. The method of claim 1, wherein providing the third graphical representation comprises providing situational awareness of a remaining available control margin between the current input state of the user input device and a nearest boundary of the subset of the full actuation range of the user input device, wherein the nearest boundary represents a maximal extent of actuation of the user input device at which point a respective effector is no longer capable of influencing a position or orientation of the aircraft given the current aircraft state information.

8. The method of claim 1, further comprising providing a user notification when the current input state is within a threshold distance of a nearest boundary of the subset of the full actuation range of the user input device, wherein the nearest boundary represents a maximal extent of actuation of the user input device at which point a respective effector is no longer capable of influencing a position or orientation of the aircraft given the current aircraft state information.

9. The method of claim 1, wherein the range of potential effective input states represents a maximal extent of actuation of the user input device at which point a respective effector is no longer capable of influencing a position or orientation of the aircraft given the current aircraft state information.

10. The method of claim 1, wherein providing the third graphical representation comprises providing a graphical indication of an available control margin comprising a difference between the current input state of the user input device and a maximal effective input state of the user input device within the full actuation range.

11. The method of claim 1, wherein:

the aircraft comprises a vertical takeoff and landing (VTOL) aircraft; and the third graphical representation of the current input state of the user input device with respect to the second graphical representation of the range of potential effective input states comprises a remaining amount of available control margin for the user input device producing movement in three-dimensional space before saturating capabilities of the VTOL aircraft with respect to one or more dimensions.

12. The method of claim 1, wherein:

the aircraft comprises a vertical takeoff and landing (VTOL) aircraft; and the one or more effectors of the plurality of effectors comprise a lift fan.

13. The computer-readable medium of claim 6, wherein the current actuation state information comprising one or more preceding effector commands and the computer-executable instructions are configurable to cause the processing system to:

determine the first range of achievable accelerations for the aircraft based on a relationship between the effector limits and the one or more preceding effector commands;

determine a second range of achievable attitudes for the aircraft based at least in part on the first range of achievable accelerations;

determine a third range of achievable translational velocities for the aircraft based at least in part on a subset of translational acceleration limits of the first range of achievable accelerations and the second range of achievable attitudes for the aircraft; and convert the second range of achievable attitudes and the third range of achievable translational velocities to the range of potential effective input states.

14. The computer-readable medium of claim 13, wherein the computer-executable instructions are configurable to cause the processing system to:

identify a yaw angle limit based at least in part on the second range of achievable attitudes; and map the yaw angle limit and the third range of achievable translational velocities to a range of effective input states for the user input device.

15. The computer-readable medium of claim 6, wherein the aircraft comprises a vertical takeoff and landing (VTOL) aircraft or a fly-by-wire aircraft.

16. The computer-readable medium of claim 6, wherein the one or more inertial rates includes at least one of a translational acceleration and an angular acceleration.

17. The computer-readable medium of claim 6, wherein:

the current actuation state information comprises a current effector state for the plurality of effectors;

the effector limits comprise a range of achievable effector states associated with the plurality of effectors; and the flight dynamics model is configurable to map a combination of the current aircraft state information and the current effector state for the plurality of effectors to one or more state space matrices.

18. The computer-readable medium of claim 17, wherein the one or more state space matrices define at least one of a stability derivative and a control derivative of the aircraft.

19. An aircraft system comprising:

a plurality of effectors capable of influencing at least one of a spatial position and an orientation of an aircraft;

at least one user input device to receive an input control command to adjust one or more inertial rates of the aircraft;

a display device;

one or more onboard systems to provide current aircraft state information;

a data storage element maintaining a flight dynamics model associated with the aircraft; and a control module coupled to the display device, the data storage element, the at least one user input device, the one or more onboard systems and the plurality of effectors, wherein the control module is configurable to:

identify effector limits for saturating respective effectors of the plurality of effectors based at least in part on the current aircraft state information and current actuation state information for the plurality of effectors using the flight dynamics model;

determine a first range of achievable accelerations for the aircraft based at least in part on a relationship between the effector limits for saturating the respective effectors of the plurality of effectors and the current actuation state information;

determine a range of potential effective input states for the at least one user input device to adjust the one or more inertial rates of the aircraft before saturating one or more effectors of the plurality of effectors based on the first range of achievable accelerations, wherein the range of potential effective input states comprises a subset of a full actuation range of the at least one user input device;

provide, on the display device, a graphical user interface (GUI) display including a graphical representation of the full actuation range of the at least one user input device with respect to a second graphical representation of the range of potential effective input states; and provide, on the GUI display, a third graphical representation of a current input state of the at least one user input device with respect to the second graphical representation of the range of potential effective input states and the graphical representation of the full actuation range.

* * * * *